United States Patent
Kubota et al.

[11] 3,896,112
[45] July 22, 1975

[54] BISBENZOPYRAN AND BISBENZOPYRYLIUM ADDUCTS

[75] Inventors: Tomio Kubota; Katsue Kojima; Masafumi Ohta, all of Tokyo, Japan

[73] Assignee: Kabushiki Kaisha Ricoh, Tokyo, Japan

[22] Filed: Oct. 20, 1972

[21] Appl. No.: 299,272

[30] Foreign Application Priority Data
Oct. 21, 1971    Japan.............................. 46-83586

[52] U.S. Cl............. 260/240 D; 260/345.2; 96/1.5; 96/1.6
[51] Int. Cl............................................ C07d 7/32
[58] Field of Search ........ 260/240 D, 345.2; 96/1.5, 96/1.6

[56] References Cited
UNITED STATES PATENTS

| | | | |
|---|---|---|---|
| 3,526,502 | 9/1970 | Murakami............................ | 96/1.5 |
| 3,586,500 | 6/1971 | Contois................................ | 96/1.6 |
| 3,617,268 | 11/1971 | Murakami............................ | 96/1.5 |

*Primary Examiner*—Henry R. Jiles
*Assistant Examiner*—C. M. S. Jaisle
*Attorney, Agent, or Firm*—Cooper, Dunham, Clark, Griffin & Moran

[57] ABSTRACT

A sensitizer for use in electrophotography comprising a bisbenzopyran or bisbenzopyrylium adduct of a member selected from the group consisting of bisbenzopyrylium salts represented by the general formula I:

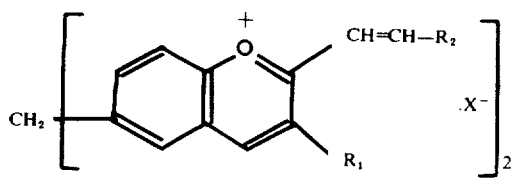

wherein $R_1$ represents hydrogen, iso- or normal-alkyl radical having 1 to 10 carbon atoms or the phenyl radical; $R_2$ represents phenyl, naphthyl styryl or any of these radicals having 1 to 3 substituents selected from methyl radical, alkoxy containing 1 to 4 carbon atoms such as methoxy, ethoxy and butoxy; and X represents an anionic functional radical; and benzopyrylium salts represented by the general formula II:

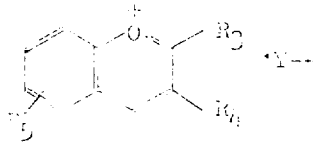

wherein $R_3$ represents methyl, phenyl or

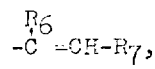

wherein $R_6$ represents hydrogen or a lower alkyl radical having 1 to 3 carbon atoms; $R_7$ represents phenyl, naphthyl or either of these radicals having 1 to 3 substituents selected from methyl, methoxy, nitro, nitrile, halogen, carboxyl, amino and hydroxy; $R_4$ represents hydrogen, methyl or phenyl; $R_5$ represents hydrogen, lower alkyl containing 1 to 2 carbon atoms, alkoxy containing 1 to 2 carbon atoms, halogen, nitro or nitrile; and Y represents an anionic functional radical;

and a member selected from the group consisting of bisbenzopyran derivatives having the following general formula I':

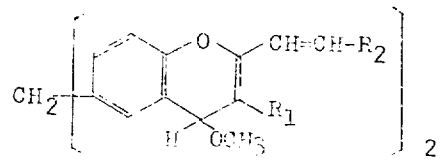

wherein $R_1$ and $R_2$ are identical with $R_1$ and $R_2$ in the general formula I respectively;

and benzopyran derivatives having the following general formula II':

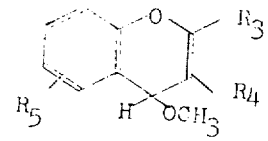

wherein $R_3$, $R_4$ and $R_5$ are identical with $R_3$, $R_4$ and $R_5$ in the general formula II respectively.

6 Claims, 8 Drawing Figures

BISBENZOPYRAN AND BISBENZOPYRYLIUM ADDUCTS

BACKGROUND OF THE INVENTION

1. Field of the Invention

The present invention relates to novel sensitizers for use in electrophotography comprising adducts of bisbenzopyrylium or bisbenzopyran derivatives. It relates also to novel compositions containing them and to photoconductive plates prepared from such compositions.

2. Description of the Prior Art

Sensitizers utilized in electrophotographic sensitive products include Rose Bengal, Crystal Violet and the like. However, these conventional sensitizers are not completely satisfactory with respect to chemical and spectral sensitivity. Moreover, they often fade due to the drying heat utilized in the preparation of the sensitive paper, because of insufficient thermal stability.

Chemical and spectral sensitivity are terms well known in the art. They refer respectively to the photosensitivity attainable with a given quantity of light and to extending the wave length to which the basic photoconductor responds. Sensitizers used in electrophotography are used to increase both chemical and spectral sensitivity of photoconductors.

SUMMARY OF THE INVENTION

The products of this invention are sensitizers providing conspicuously enhanced chemical and spectral sensitivity to organic photoconductors. Additionally, they have excellent thermal stability.

It has now been discovered that adducts of certain bisbenzopyrylium or bisbenzopyran derivatives are remarkably stable to heat and are capable of augmenting the chemical sensitivity and remarkably extending the spectral sensitivity of organic photoconductors. These adducts comprise members of the group consisting of bisbenzopyrylium salts represented by formula I:

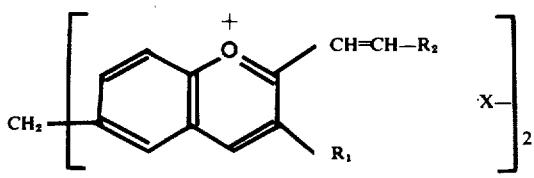

wherein $R_1$ represents hydrogen, iso- or normal-alkyl radical having 1 to 10 carbon atoms or the phenyl radical; $R_2$ represents phenyl, naphthyl, styryl or any of these radicals having 1 to 3 substituents selected from methyl radical, alkoxy containing 1 to 4 carbon atoms such as methoxy, ethoxy and butoxy; and X represents an anionic functional radical;

and benzopyrylium salts represented by the general formula II:

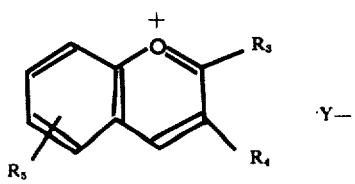

wherein $R_3$ represents methyl, phenyl or

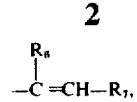

wherein $R_6$ represents hydrogen or a lower alkyl radical having 1 to 3 carbon atoms; $R_7$ represents phenyl, naphthyl or either of these radicals having 1 to 3 substituents selected from methyl, methoxy, nitro, nitrile, halogen, carboxyl, amino and hydroxy; $R_4$ represents hydrogen, methyl or phenyl; $R_5$ represents hydrogen, lower alkyl containing 1 to 2 carbon atoms, alkoxy containing 1 to 2 carbon atoms, halogen, nitro or nitrile; and Y represents an anionic functional radical;

and a member selected from the group consisting of bisbenzopyran derivatives having the following general formula I':

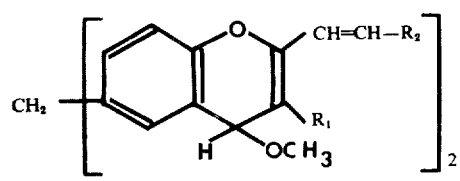

wherein $R_1$ and $R_2$ are identical with $R_1$ and $R_2$ in the general formula I respectively:

and benzopyran derivatives having the following general formula II':

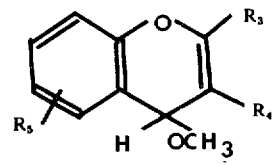

wherein $R_3$, $R_4$ and $R_5$ are identical with $R_3$, $R_4$ and $R_5$ in the general formula II respectively; with the proviso that the adduct must contain either a bisbenzopyran or a bisbenzopyrylium derivative.

They may be prepared by reacting a salt represented by general formula I or II with a derivative represented by general formula I' or II' in a reaction inert organic solvent at a temperature of from about 50°C. to 60°C. during a period of from about 4 to 8 hours, preferably 4 to 6 hours. Suitable solvents include, for example, hydrocarbon and halogenated hydrocarban solvents containing up to about four carbon atoms. Dichloromethane and dichloroethane are preferred. The optimum weight ratio of the compounds of formulas I' or II' to the compounds of formulas I or II is from about 1:1 to 3:1.

Bisbenzopyrylium salts of formula I may be prepared by reacting methylene bissalicylaldehyde with a ketone in an acid solvent at a low temperature in the range of 0°C. to 30°C. in the presence of a mineral acid such as hydrochloric acid and subsequently reacting the product formed with an aldehyde to close the ring at a temperature in the range of 0°C. to 30°C. Typical examples of the compounds prepared by this procedure include diphenyl phosphates, phosphates, iodides, bromides, sulfonates and perchlorates of:

1. 6,6'-methylene bis-[2-(2', 3', 4'-trimethoxy styryl)-3-phenyl] benzopyrylium 2. 6,6'-methylene bis-[2'-(4'-methoxy naphthoethenyl)-3-phenyl] benzopyrylium
3. 6,6'-methylene bis-[2-(3',4'-dimethoxy styryl)-3-phenyl] benzopyrylium
4. 6,6'-methylene bis-[2-(p-methyl styryl)-3-phenyl] benzopyrylium
5. 6,6'-methylene bis-[2-(2', 4'-dimethoxy styryl)-3-phenyl] benzopyrylium
6. 6,6'-methylene bis-[2-(P-methoxy styryl)-3-phenyl] benzopyrylium
7. 6,6'-methylene bis-[2-(P-ethoxy styryl)-3-phenyl] benzopyrylium
8. 6,6'-methylene bis-[2-(P-butoxy styryl)-3-phenyl] benzopyrylium
9. 6,6'-methylene bis-[2-(P-methoxy styryl)] benzopyrylium
10. 6,6'-methylene bis-[2-(P-methoxy styryl)-3-butyral] benzopyrylium
11. 6,6'-methylene bis-[2-(p-ethoxy styryl)-3-octyl] benzopyrylium
12. 6,6'-methylene bis-[2-(P-2', 4'-dimethoxy styryl)-3-octyl] benzopyrylium
13. 6,6'-methylene bis-[2-(P-methoxy styryl)-3-decyl] benzopyrylium
14. 6,6'-methylene bis-[2-naphthoethenyl-3-phenyl] benzopyrylium perchlorate
15. 6,6'-methylene bis-[2-(3', 4'-diethoxy styryl)-3-phenyl] benzopyrylium
16. 6,6'-methylene bis-[2-(ω-2'-methoxy phenyl butadienyl)-3'-phenyl] benzopyrylium The following examples illustrate methods for the preparation of these novel and valuable compounds.

EXAMPLE 1

Synthesis of 6,6'-methylene bis-[2-(2', 3', 4'-trimethoxy styryl-3-phenyl] benzopyrylium perchlorate A solution prepared by dissolving 2.5 g of 5,5'-methylene bissalicylaldehyde in 40 ml of tetrahydrofuran is thoroughly mixed with another solution prepared by dissolving 3 g of benzylmethyl ketone in 20ml of 90 percent formic acid, and the resulting mixture is saturated with hydrochloric acid gas at a temperature in the range of 0°C. to 5°C. The thus saturated solution is left standing for about 2 hours in an ice room at a temperature of from 0°C. to 5°C. Subsequently, a solution prepared by dissolving 4 g of 2,3,4-trimethoxy benzadehyde in 30 ml of 90 percent formic acid is added, and the mixture is again saturated with hydrochloric acid gas. After being left standing overnight in the ice room, the thus saturated solution is poured into a cold aqueous solution of 15 percent perchloric acid to produce crystals, and subsequently to continuous agitation for an additional 30 minutes. The crystals are recovered by suction filtration. The resulting crystals are recrystallized from 300 ml of acetic acid to provide 9.3 g of crystals having a melting point in the range of 223°C. to 225°C.

The following compounds were obtained by using 23.6 percent diphenyl phosphoric acid, 10 percent phosphoric acid, 15 percent potassium iodide, 15 percent potassium bromide and 15 percent sulphonic acid in lieu of 15 percent perchloric acid in the synthesis example, respectively.

6,6'-methylene bis-[2-(2',3',4'-trimethoxy styryl)-3-phenyl] benzopyrylium diphenyl phosphate 12 g, m.p. 105°C.
6,6'-methylene bis-[2-(2',3',4'-trimethoxy styryl)-3-phenyl] benzopyrylium phosphate 11 g, m.p. 117°C.
6,6'-methylene bis-[2-(2',3',4'-trimethoxy styryl)-3-phenyl] benzopyrylium iodide 9.5 g, m.p. 190°C.
6,6'-methylene bis-[2-(2',3',4'-trimethoxy styryl)-3-phenyl] benzopyrylium bromide 9.2 g, m.p. 181°C.
6,6'-methylene bis-[2-(2',3',4'-trimethoxy styryl)-3-phenyl] benzopyrylium sulphonate 9 g, m.p. 120°C.

The absorption properties of these compounds were identical with that of 6,6'-methylene-bis-[2-(2',3',4'-trimethoxy styryl) -3-phenyl] benzopyrylium perchlorate.

EXAMPLE 2

Synthesis of 6,6'-methylene bis-[2-(4'-methoxy naphthoethenyl)-3-phenyl] benzopyrylium perchlorate A solution prepared by dissolving 2.5 g of 5,5'-methylene bissalicylaldehyde in 40 ml of tetrahydrofuran is thoroughly mixed with another solution prepared by dissolving 3 g of benzylmethyl ketone in 20 ml of 90 percent formic acid. The resulting mixture is saturated with hydrochloric acid gas at a temperature in the range of 0°C. to 5°C. The thus saturated solution is left standing for about 4 hours in an ice room. Subsequently, a solution prepared by dissolving 4 g of 4-methoxy naphthaldehyde in 20 ml of 90 percent formic acid is added, and the mixture is again saturated with hydrochloric acid. After standing overnight in an ice room, the thus saturated solution is poured into a cold aqueous solution of 15 percent perchloric acid to produce crystals which are recovered and purified by the method of Example 1 to provide 7.7 g of product melting at 228°C. to 229°C.

The iodide, bromide and diphenyl phosphate are similarly prepared.

EXAMPLE 3

Synthesis of 6,6'-methylene bis-[2-(2', 4'-dimethoxy styryl)-3-oxtyl] benzopyrylium perchlorate A solution prepared by dissolving 2.6 g of 5,5'-methylene bissalicylaldehyde in 40 ml of ethyl alcohol is thoroughly mixed with another solution prepared by dissolving 3.4 g of methylethyl ketone in 20 ml of 90 percent formic acid. The resulting mixture is further mixed with 5 ml of 60 percent perchloric acid and is saturated with hydrochloric acid gas at a temperature in the range of 0°C. to 5°C. The thus saturated solution is left standing in a cold room. Subsequently, a solution prepared by dissolving 3.2 g of 2,4dimethoxy benzaldehyde in 10 ml of formic acid is added to the cold solution, and the mixture is again saturated with hydrochloric acid gas at a temperature in the range of 0°C. to 5°C. This saturated solution is left standing overnight in a cold room, and thereafter 15 percent aqueous solution of perchloric acid is poured into the solution for the purpose of separating the product. The resulting tarlike substance is separated from the layer of water by decantation. When the thus separated tarlike substance is washed in ether several times, there is obtained a powder. By filtration and then recrystallization from 150 ml of acetic acid, 7.5 g of crystals having the melting point of 200°C. to 202°C. are obtained.

Benzopyrylium salts of general formula II can be prepared by the steps of:
1. reacting a substituted 2-hydroxy benzaldehyde and a ketone in an acid solvent at room temperature in the presence of a mineral acid, and
2. adding an aldehyde to the same reaction zone to thereby close the ring at a temperature in the range of 0°C. to 30°C.

Typical compounds of formula II include, for example, the diphenyl phosphates, phosphates, iodides, bromides, sulfonates and perchlorates of:
1. 2-P-methoxy styryl)-3-phenyl-6-methoxy benzopyrylium
2. 2-(P-methoxy styryl)-3-phenyl-6-methyl benzopyrylium
3. 2-(P-methoxy styryl)-3-phenyl-6-chlorobenzopyrylium
4. 2-)P-nitrostyryl)-3-phenyl benzopyrylium
5. 2-(P-chlorostyryl)-3-phenyl benzopyrylium
6. 2-(P-methoxy styryl)-3-phenyl-7-methyl benzopyrylium
7. 2-(P-methoxy styryl)-3-phenyl-6,7-dimethyl benzopyrylium
8. 2-phenyl benzopyrylium
9. 2-(P-nitrophenyl) benzopyrylium
10. 2-(P-chlorophenyl) benzopyrylium
11. 2-(P-aminophenyl) benzopyrylium
12. 2-methyl benzopyrylium
13. 2-(P-nitrophenyl)-6-methoxy benzopyrylium
14. 2-(P-chlorophenyl)-6-methoxy benzopyrylium
15. 2-(α-isopropyl-P-methoxy styryl) benzopyrylium
16. 2-(α-isopropyl-styryl) benzopyrylium The novel compounds may be prepared as illustrated in the following examples:

EXAMPLE 4

Synthesis of 2-(P-methoxy styryl)-3-phenyl-6-methoxy benzopyrylium perchlorate

A mixture of 12 g of 2-hydroxy-5-methoxy benzaldehyde and 11 g of phenyl acetone is dissolved in 45 ml of 90 percent formic acid, and while agitating the solution at room temperature, 30 ml of undiluted hydrochloric acid is added to the solution drop by drop over a period of 20 to 30 minutes. After 2 hours' agitation subsequent to completion of the addition, 12 g of P-anisaldehyde and 50 ml of 90 percent formic acid are added to the solution and thereafter 10 ml of undiluted hydrochloric acid are added drop by drop at room temperature over the period of about 20 minutes. The solution is agitated for one hour and then is left standing overnight. The resulting reaction mixture is added to 180 ml of 15 percent aqueous perchloric acid at a temperature under 10°C. over a period of about 2 hours with agitation. The separated substance is separated by suction filtration, and washed with 300 to 400 ml of ethyl ether. As a result, there is obtained 27 g of a crystal melting at 226°C. to 228°C.

Other anionic salts such as those of Examples 1 to 3 are similarly prepared.

EXAMPLE 5

Synthesis of 2-phenyl benzopyrylium perchlorate 50 g of 2-hydroxy benzaldehyde are mixed with 50 g of acetophenone. This mixture, after the addition of 180 ml of 90 percent formic acid and 60 ml of 60 percent perchloric acid, is cooled down to less than 0°C. with a freezing mixture, and then excess hydrochloric acid gas is blown through the mixture. After completion of the reaction, the mixture is left standing overnight in an ice room. Subsequently, the reacted mixture is added to about 450 to 500 ml of cold ethyl ether over a period of about 30 minutes to precipitate crystals. After filtration, the crystals are washed in ethyl ether several times and then dried. As a result, there are obtained 60 g of crystals having a melting point of 177.6°C.

EXAMPLE 6

Synthesis of 2-(P-methoxy styryl)-3-phenyl-6-chlorobenzopyrylium perchlorate

A mixture of 12 g of 2-hydroxy-5-chlorobenzaldehyde and 11 g of phenyl acetone is dissolved in 45 ml of 90 percent formic acid. While agitating this solution at room temperature, 30 ml of 35 percent hydrochloric acid is slowly added over a period of 20 to 30 minutes. After 2 hours' agitation subsequent to completion of the addition, 12 g of P-anisaldehyde and 50 ml of formic acid are added to the solution and 10 ml of 35 percent hydrochloric acid are dropped into the resulting solution at room temperature over a period of about 20 minutes. Thereafter, the solution is agitated for one hour and left standing overnight. The resulting reacted mixture is cooled to less than 0°C. The thus cooled mixture is slowly added to 180 ml of aqueous solution of 15 percent perchloric acid while agitating over the period of about 2 hours. The separated substance is recovered by suction filtration, washed in 300 to 400 ml of ethyl ether, and then recrystallized from acetic acid, to produce 15 g of crystals melting in the range of 214°C. to 216°C.

Anionic salts such as those prepared in Examples 1 to 3 are similarly prepared.

Compounds represented by general formula I' can be obtained by subjecting a compound of general formula I to reflux treatment in a mixed solution of methanol and benzene in the presence of alkali. A compound thus prepared is a decolorized derivative from the compound to be expressed by the general formula I.

The following example illustrates the preparation of typical compounds:

EXAMPLE 7

Synthesis of 6,6'-methylenebis-[2-(2',3',4'-trimethoxy styryl)-3-phenyl-4-methoxy] benzopyran 2 g of 6,6'-methylenebis-[2-(2',3',4'-trimethoxy styryl-3-phenyl] benzopyrylium perchlorate and 3 g of sodium bicarbonate are added to a mixed solution of 10 ml of methanol and 20 ml of benzene, and the resulting mixture is refluxed for about one hour. Thereafter, the mixture is cooled and then subjected to suction filtration. The filtrate is concentrated under a reduced pressure. The residue is dissolved in benzene and shaken in a separatory funnel after the addition of water, thereby completely removing the inorganics. The benzene layer is dried over Glauber's salt overnight and then filtered. The benzene is completely removed by evaporation to produce a glasslike substance melting at 128.6°C. The yield is almost quantitative.

Compounds represented by the general formula II' are obtained by subjecting a compound of the general formula II to reflux treatment in a mixed solution of methanol and benzene in the presence of alkali as in the case of the compound of general formula I'. A compound thus prepared is a decolorized derivative of the compound of general formula II.

The following example illustrates the synthesis of typical compounds:

EXAMPLE 8

Synthesis of 2-phenyl-4-methoxy-1,4-benzopyran 7.1 g of 2-phenyl-benzopyrylium perchlorate and 15 g of sodium bicarbonate are added to a mixed solution of 50 ml of methanol and 100 ml of benzene, and the resulting mixture is refluxed for about one hour. Thereafter, the mixture is cooled and subjected to suction filtration. The filtrate is concentrated under a reduced pressure. The residue is dissolved in benzene and shaken in a separating funnel upon adding water, thereby completely removing inorganic matters therefrom. The layer of benzene is dried with Glauber's salt overnight and then filtered. When benzene is completely removed by evaporation, a glasslike substance having a melting point at 128°C to 130°C. is obtained in almost quantitative yield.

The formation of an adduct of a compound of general formula I or II with a compound of general formula I' or II' obtained as above is performed by the following process:

The decolorized derivative I' or II' obtained as above is mixed with an appropriate bisbenzopyrylium salt I or benzopyrylium salt II, respectively, so as to attain the weight ratio of 1:1 to 3:1. Then, upon further adding 150 ml of an inert solvent such as dichloroethane, the mixture is subjected to reflux treatment by heating at a temperature in the range of about 50°C. to 60°C. for from about 4 to 8 hours. Subsequently, about 100 ml of the solvent in the reaction zone are removed by evaporation under a reduced pressure. The residual liquid (about 50 ml in quantity) is cooled down to room temperature, and then added to 300 ml of ethyl ether little by little, thereby separating a crystal of intended adduct. After leaving intact for about 30 minutes, the reaction product is subjected to suction filtration and the crystals thus obtained are dried under a reduced pressure.

Typical adducts obtained through the foregoing process are illustrated in the following Table 1:

Table 1

| No. | General formula[I] | General formula[II] | General formula[I] | General formula[II] |
|---|---|---|---|---|
| 1 | 6,6'-methylene bis [2-(4'-methoxy naphthoethenyl)-3-phenyl-4-methoxy] benzopyran | | 6,6'-methylenebis [2-(4'-methoxy naphthoethenyl)-3-phenyl] benzopyrylium perchlorate | |
| 2 | Ditto | | | 2-(P-methoxy styryl)-3-phenyl-6-methoxy benzopyrylium perchlorate |
| 3 | 6,6'-methylenebis [2-(2',3',4'-trimethoxy styryl)-3-phenyl-4-methoxy] benzopyran | | | Ditto |
| 4 | Ditto | | 6,6'-methylenebis [2-(2',3',4'-trimethoxystyryl)-3-phenyl] benzopyrylium perchlorate | |
| 5 | Ditto | | | 2-phenyl benzopyrylium perchlorate |
| 6 | 6,6'-methylenebis [2-(4'-methyl styryl)-3-phenyl-4-methoxy] benzopyran | | 6,6'-methylenebis [2-(4'-methyl styryl)-3-phenyl] benzopyrylium perchlorate | |
| 7 | Ditto | | | 2-(P-nitrostyryl)-3-phenyl benzopyrylium perchlorate |
| 8 | 6,6'-methylenebis[2-(4'-butoxy styryl)-3-phenyl-4-methoxy] benzopyran | | 6,6'-methylenebis[2-(4'-butoxy styryl)-3-phenyl] benzopyrylium perchlorate | |
| 9 | Ditto | | | 2-(P-chlorostyryl)-3-phenyl benzopyrylium perchlorate |
| 10 | | 2-(P-methoxy styryl)-3-phenyl-4,6-dimethoxy benzopyran | 6,6'-methylene bis [2-(2',3',4'-trimethoxy styryl)-3-phenyl] benzopyrylium perchlorate | |
| 11 | | Ditto | 6,6'-methylenebis-[2-(4'-methoxy naphthoethenyl)-3-phenyl] benzopyrylium perchlorate | |
| 12 | | Ditto | 6,6'-methylenebis-[2-(2',4'-diemthoxy styryl)-3-oxtyl] benzopyrylium perchlorate | |
| 13 | | 2-(P-nitrostyryl)-3-phenyl-4-methoxy benzopyran | 6,6'-methylenebis-[2-(2',3',4'-trimethoxy styryl)-3-phenyl] benzopyrylium perchlorate 6,6'-methylenebis- | |

Table 1—Continued

| No. | General formula[I] | General formula[II] | General formula[I] | General formula[II] |
|---|---|---|---|---|
| 14 | | Ditto | [2-(3',4'-dimethoxy styryl)-3-phenyl] benzopyrylium perchlorate | |
| 15 | | Ditto | 6,6'-methylenebis-[2-(P-ethoxy styryl)-3-octyl] benzopyrylium perchlorate | |
| 16 | | 2-(P-nitrophenyl)-4-methoxy benzopyran | 6,6'-methylenebis-[2-(3',4'-dimethoxy styryl)-3-phenyl] benzopyrylium perchlorate | |
| 17 | | Ditto | 6,6'-methylenebis-[2-(4'-methoxy naphthoethenyl)-3-phenyl] benzopyrylium perchlorate | |
| 18 | | Ditto | 6,6'-methylenebis-[2-(P-ethoxy styryl)-3-octyl] benzopylium perchlorate | |
| 19 | | 2-(P-chlorophenyl)-4,6-dimethoxy benzopyran | 6,6'-methylenebis-[2-(ω-2'-methoxy phenyl butadienyl)-3'-phenyl] benzopyrylium perchlorate | |
| 20 | | Ditto | 6,6'-methylenebis-[2-naphthoethenyl-3-phenyl] benzopyrylium perchlorate | |
| 21 | | Ditto | 6,6'-methylenebis-[2-(2',3',4'-trimethoxy styryl)-3-phenyl] benzopyrylium perchlorate | |
| 22 | | 2-(α-isopropyl-P-methoxy styryl)-4-methoxy benzopyran | Ditto | |
| 23 | | Ditto | 6,6'-methylenebis-[2-(3',4'-dimethoxy styryl)-3-phenyl] benzopyrylium perchlorate | |
| 24 | | Ditto | 6,6'-methylenebis-[2-(4'-methoxy naphthoethenyl)-3-phenyl] benzopyrylium perchlorate | |
| 25 | | 2-(α-isopropyl styryl)-4-methoxy benzopyran | Ditto | |
| 26 | | Ditto | 6,6'-methylenebis-[2-(3',4'-dimethoxy styryl)-3-phenyl] benzopyrylium perchlorate | |
| 27 | | Ditto | 6,6'-methylenebis-[2-(4'-methoxy naphthoethenyl)-3-phenyl] benzopyrylium perchlorate | |
| 28 | | 2-phenyl-4-methoxy benzopyran | 6,6'-methylenebis-[2-(2',3',4'-trimethoxy styryl)-3-phenyl] benzopyrylium perchlorate | |

Although the anions listed in the above table are all perchlorate, other anionic radicals such as those illustrated in the foregoing examples can be employed. In fact, any of a very large number of anions can be employed since the concentration of anion in the final photoconductive product is so low that it is essentially inert. Typical anions include perchlorate, periodate, perbromate, phosphate, chloride, sulfate, carbonate, iodide bromide, diphenyl phosphate, and dimethoxy phosphate.

The following examples in which adducts No. 1, No. 2, No. 3, No. 4, No. 10, No. 11 and No. 28 from the foregoing Table 1 are employed illustrate the advantages of this invention.

PREFERRED EMBODIMENTS OF THE INVENTION

Examples

The adduct No. 1 in Table 1 was dissolved in a minimum quantity of dichloroethane, and a proper quantity of the resulting solution (i.e., 0.2 to 1.0 wt percent against the solid content of the sensitive liquid) was added to a sensitive liquid. This sensitive liquid was then applied to the surface of a processed paper by means of a test-coating machine so as to attain the dry thickness of the coating film of about 5 $\mu$ and was dried by heating, whereby a sensitive paper was prepared. This sensitive paper was subjected to actual image-printing test, spectrographic analysis and examination of surface potential decrease, whereby its sensitization effect was measured. To be precise, a sensitive liquid prepared by adding a solution obtained by dissolving the adduct (0.5 × $10^{-5}$ mol/g Br-PNVCZ) in the minimum quantity of dichloroethane required to a mixture of 350 g of chlorobenzene solution of 6.7 percent bromopoly-N-vinyl carbazole) (Br-PNVCZ), 70 g of dichloroethane solution of 10 percent polycarbonate and 4.7 g of diphenylchloride was applied to the surface of a stencil paper as the support by means of a test-coating machine so as to attain a dry thickness of the coating film of about $5\mu$ and thereafter dried, whereby a sensitive paper was prepared. This sensitive paper, after charging with negative electricity by means of a corona discharge of about 6 KV, was exposed to the reflected light of the original image for 0.2 to 0.5 seconds according to the reflective projection method, by applying a white light as the light source with illumination of 350 luxes over the sensitive film coated on the paper substrate. The thus exposed sensitive paper, when developed by means of a liquid developer and dried, produced a copied image faithful to the original image.

Utilizing a sensitive paper prepared as above and through the steps of charging it with negative electricity by means of a corona discharge of about 6 KV, exposing it to the light for 10 seconds by the use of a spectrograph whose slit was adjusted to have a width of 2 mm, developing the exposed sensitive paper by means of a liquid developer and thereafter drying it by lightly heating, a spectrogram was obtained.

FIG. 1 in the appended drawings is a curve showing the border between the toner-attached area and the non-toner-attached area in the spectrogram in the case of application of adduct No. 1.

Moreover, after charging the foregoing sensitive paper with negative electricity by means of a corona discharge of about 6 KV by the use of a device equipped with a tungsten glow lamp and a surface potentiometer, its surface potential loss was examined and sensitivity in terms of E 1/2 (lux. sec.) was calculated.

Further, the same tests as above were conducted on various sensitive papers prepared by employing the adducts No. 2, No. 3, No. 4, No. 5, No. 10, No. 11 and No. 28 respectively. The results were as summarized in FIGS. 2 through 8 and Table 2.

In this connection, Table 2 also carries the wavelength at the sensitivity peak, the absorption maximum wave-length ($\lambda$max) of the dichloroethane solution of each adduct, the specific absorption coefficient ($\epsilon/10^4$) and the color of solution.

As is evident from the showings in FIGS. 1 to 8 and Table 2, the sensitive papers employing the adducts according to the present invention, when compared with the sensitive paper employing bromo-poly-(N-vinyl carbazole) alone (wherein the intrinsic sensitivity peak is in the range of 350 mm to 360 m$\mu$), show a remarkable enhancement in spectral sensitivity. Not only that, the sensitivity in terms of E ½ is also remarkably improved as compared with the sensitive paper employing bromo-poly-(N-vinyl carbazole) alone (wherein E ½ = 8,000 lux.sec).

Table 2

| Adduct | E ½ (lux.sec) | Sensitivity Peak (m$\mu$) | $\lambda$Max (m$\mu$) | $\epsilon/10^4$ | Color of Solution |
|---|---|---|---|---|---|
| No. 1 | 18.0 | 672 | 662 | 7.01 | Blue |
| No. 2 | 17.4 | 674 | 660 | 4.65 | Blue |
|  |  |  | 584 | 4.74 |  |
| No. 3 | 12.6 | 666 | 656 | 2.97 | Blue |
|  |  |  | 599 | 5.67 |  |
| No. 4 | 18.3 | 690 | 674 | 2.52 | Blue |
|  |  |  | 607 | 5.07 |  |
| No. 5 | 14.9 | 608 | 600 | 8.32 | Bluish Violet |
|  |  |  | 560 | 5.02 |  |
|  |  |  | 402 | 2.34 |  |
| No. 10 | 12.0 | 666 | 656 | 2.85 | Blue |
|  |  |  | 598 | 5.52 |  |
| No. 11 | 12.3 | 675 | 662 | 4.70 | Blue |
|  |  |  | 584 | 4.83 |  |
| No. 28 | 13.0 | 610 | 601 | 8.21 | Bluish Violet |
|  |  |  | 560 | 5.07 |  |
|  |  |  | 402 | 2.36 |  |

Figure 1:
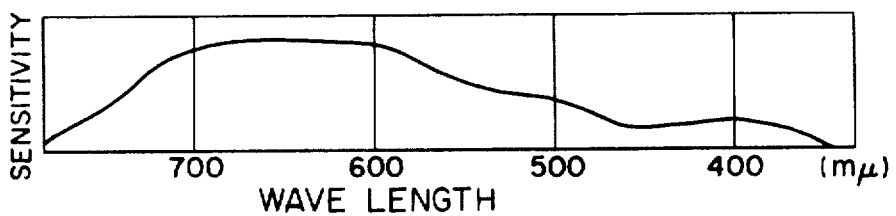
FIGS. 1 to 8 are the curves indicating the border between the toner-attached area and the non-toner-attached area in the spectrogram in cases utilizing adducts No. 1, No. 2, No. 3, No. 4, No. 5, No. 10, No. 11 and No. 28 respectively in the foregoing embodiments of the present invention.
Figure 2:
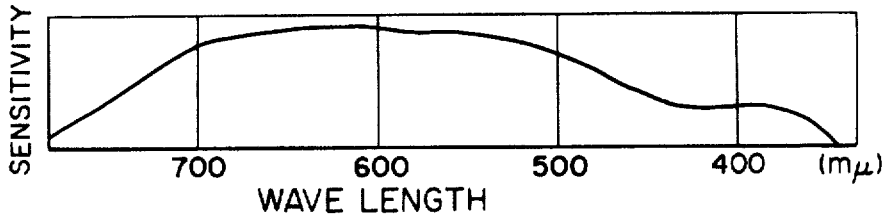
Figure 3:
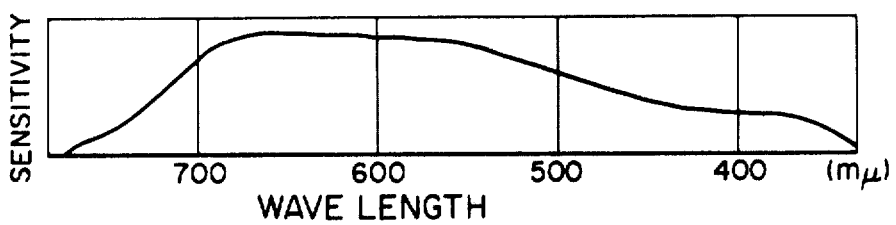
Figure 4:
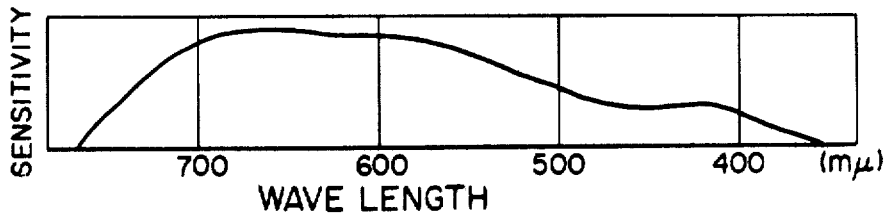
Figure 5:
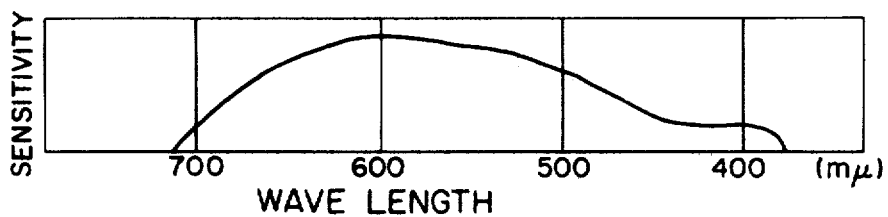
Figure 6:
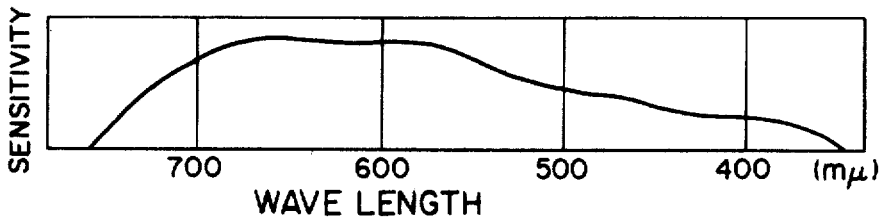
Figure 7:
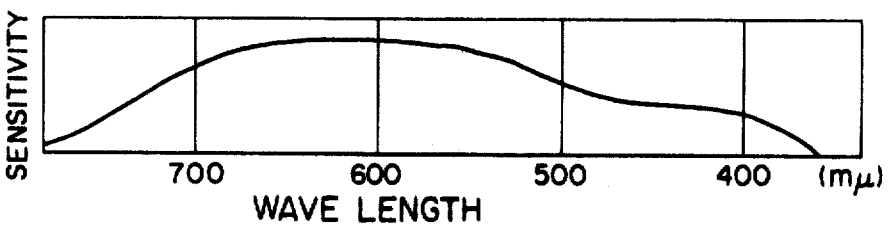
Figure 8:
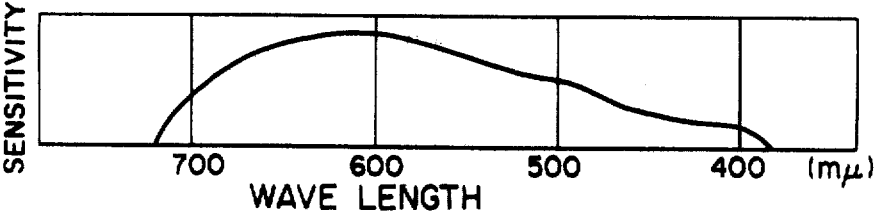

The foregoing examples illustrate the advantages of this invention with one type of organic photoconductors. The sensitizers of this invention manifest like advantages and are similarly useful with other organic photoconductors including, for example: polycyclic condensation compounds such as pyrene, perylene and anthracene; phenothiazine, phenoxazine, thionine, 9,9-diphenyl-9,10-dihydroanthracene, 2,3-diphenylpyrrocoline, $\alpha,\omega$-bis-(N-carbazolyl)-propane, N,N,N',N'-tetrabenzyl-p-phenylene-diamine, 1,6-dimethoxy-phenazine, 1,8-bis-(dimethylamino)-naphthalene, 1,1,5-triphenylprop-1-ene-4-ine-3-ole, N-ethylcarbazole, N-propylcarbazole, 3,6-dibromo-N-ethylcarbazole, 3,6-dibromo-N-ethylcarbazole, 2-phenyl-3-p-dimethylaminophenylquinoxaline, acridine, p,p'-bis-dimethylaminobiphenyl, p,p'-bis-diphenylaminobiphenyl, 2,3,4,5-tetrakis-(p-dimethylaminophenyl)-pyrrolo, 2-p-dimethylaminophenyl-3,4-diphenylimidazole, 2,5-bis-(p-dimethylaminophenyl)-1,3,4-oxadiazole, 4-phenyl-5-p-dimethylamino-phenyl-3H-2-imidazolone, etc.; high molecular compounds such as poly-N-vinylcarbazole, poly-3-vinyl-N-ethylcarbazole, poly-N-(N-acrylamidomethyl)-carbamoyl-methyl (or ethyl) carbazole, poly-phenylene-pyrazole, poly-1-allyl-4,5-diphenylimidazole, poly-vinyl-pyrene, poly-vinylphenanthrene, poly-acenaphthylene, poly-N-vinyl-3,6-dibromocarbazole, polyvinyldibenzothiophene, poly-1-vinylacridine, Poly-N-allylphenothiazine, allylphenothiazine, poly-p-imidazolyl-(2)-styrene, poly-vinylanthracene, poly-p-phenylene-1,3,4-oxaziazole, anthracene~formaldehyde resin, poly-(pryomellitic imide), vinylanthracene~N-vinylcarbazole copolymer, 1,2-dehydroacenaphthene~indene copolymer, pyrene~formaldehyde resin, poly-(vinylmalachite green), poly-vinylbenzofuran, poly-2-vinyl-quinoline, poly-2-vinylfuran, poly-3-benzofuran, poly-2-vinyl-4(4'-dimethylaminophenyl)-5-phenyloxazole, the reaction products of polyvinylamine with anthracene-9-aldehyde, naphthalene formaldehyde resin and N-ethylcarbazone~formaldlehyde resin.

Useful photosensitive compositions for the preparation of photoconductive plates utilizing the novel sensitizers of this invention are prepared generally as described above by incorporating the sensitizers in a liquid carrier containing the selected organic photoconductor or photoconductors together with a polymeric reinforcing agent or binder and such other adjuvants as are normally employed for the preparation of such products. The composition is coated on the selected substrate, for example paper, polymer film or metal, such as aluminum, magnesium or brass, and the solvent allowed to evaporate to provide the desired photoconductive plates.

In the photoconductive plates, the amount of novel sensitizer employed will typically range from about 0.2 to 1 weight percent based on the weight of the photoconductive layer. The photoconductive layer will normally contain up to about 40 percent binder or reinforcing agent based on the weight of the photoconductor. Certain photoconductors provide films of sufficient strength so that no reinforcing agent is needed. Often a plasticizer such as diphenyl chloride will be incorporated in the reinforcing agent which may be any of those normally employed in the art, for example polystyrene, polycarbonates, polyvinyl acetals or polyacrylates, polymethacrylates and derivatives thereof. Other ingredients to improve the properties of the products, of the type normally employed with organic photoconductors, may be present in quantities up to about 30 weight percent based on the weight of the photoconductor.

What is claimed is:

1. A compound which is a bisbenzopyran or bisbenzopyrylium adduct of a member selected from the group consisting of bisbenzopyrylium salts represented by the general formula I:

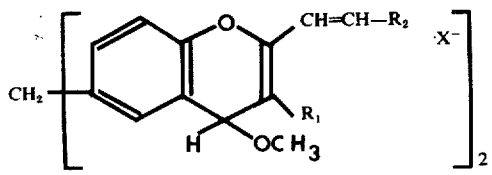

wherein $R_1$ represents hydrogen, iso- or normal-alkyl having 1 to 10 carbon atoms or phenyl; $R_2$ represents phenyl, naphthyl, styryl or any of these radicals having 1 to 3 substituents selected from methyl, alkoxy containing 1 to 4 carbon atoms; and X represents an anionic functional radical; and benzopyrylium salts represented by the general formula II:

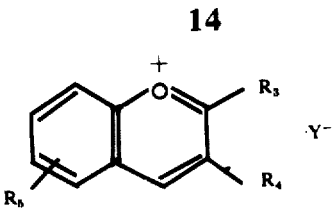

wherein $R_3$ represents methyl, phenyl or

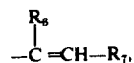

wherein $R_6$ represents hydrogen or a lower alkyl radical having 1 to 3 carbon atoms; $R_7$ represents phenyl, naphthyl or these radicals having 1 to 3 substituents selected from methyl, methoxy, nitro, nitrile, halogen, carboxyl, amino and hydroxy; $R_4$ represents hydrogen, methyl or phenyl; $R_5$ represents hydrogen, lower alkyl containing 1 to 2 carbon atoms, alkoxy containing 1 to 2 carbon atoms, halogen, nitro or nitrile; and Y represents an anionic functional radical; and a member selected from the group consisting of bisbenzopyran derivatives having the following general formula I':

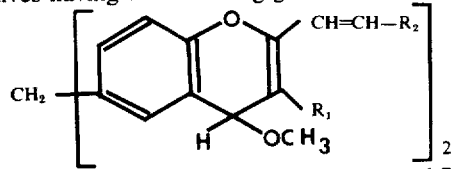

wherein $R_1$ and $R_2$ are identical with $R_1$ and $R_2$ in the general formula I respectively;

and benzopyran derivatives having the following general formula II':

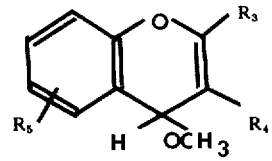

wherein $R_3$, $R_4$ and $R_5$ are identical with $R_3$, $R_4$ and $R_5$ in the general formula II respectively.

2. An adduct as in claim 1 wherein the benzopyran compound is 6,6'-methylene bis-[2-(4'-methoxy naphthoethenyl)-3-phenyl-4-methoxy] benzopyran and the benzopyrylium compound is 6,6'-methylenebis-[2-(4'-methoxy naphthoethenyl)-3-phenyl] benzopyrylium perchlorate.

3. An adduct as in claim 1 wherein the benzopyran compound is 6,6'-methylene bis-[2-(4'-methoxy naphthoethenyl)-3-phenyl-4-methoxy] benzopyran and the benzopyrylium compound is 2-(P-methoxy styryl)-3-phenyl-6-methoxy benzopyrylium perchlorate.

4. An adduct as in claim 1 wherein the benzopyran compound is 6,6'-methylenebis-[2-(2',3',4'-trimethoxy styryl)-3-phenyl-4-methoxy] benzopyran and the benzopyrylium compound is 2-(P-methoxy styryl)-3-phenyl-6-methoxy benzopyrylium perchlorate.

5. An adduct as in claim 1 wherein the benzopyran compound is 6,6'-methylenebis-[2-(2',3',4'-trimethoxy styryl)-3-phenyl-4-methoxy] benzopyran and the benzopyrylium compound is 6,6'- methylenebis-[2-(2',3',4'-trimethoxystyryl)-3-phenyl] benzopyrylium perchlorate.

6. An adduct as in claim 1 wherein the beyzopyran compound is 6,6'-methylenebis-[2-(2',3',4'-trimethoxy styryl)-3-phenyl-4-methoxy] benzopyran and the benzopyrylium compound is 2-phenyl benzopyrylium perchlorate.

* * * * *